United States Patent
Trivedi

(10) Patent No.: US 8,266,348 B2
(45) Date of Patent: Sep. 11, 2012

(54) SYSTEM AND METHOD OF COMMUNICATING WITH PORTABLE DEVICES

(75) Inventor: Himanshu Trivedi, Rochester, NH (US)

(73) Assignee: American Power Conversion Corporation, West Kingston, RI (US)

( * ) Notice: Subject to any disclaimer, the term of this patent is extended or adjusted under 35 U.S.C. 154(b) by 1380 days.

(21) Appl. No.: 11/269,877

(22) Filed: Nov. 8, 2005

(65) Prior Publication Data

US 2007/0136497 A1    Jun. 14, 2007

(51) Int. Cl.
*G06F 13/12* (2006.01)
*G06F 13/38* (2006.01)

(52) U.S. Cl. ........... 710/62; 307/2; 307/151; 340/425.1; 370/315; 713/300

(58) Field of Classification Search .............. 710/62; 307/121
See application file for complete search history.

(56) References Cited

U.S. PATENT DOCUMENTS

| | | | |
|---|---|---|---|
| 5,994,998 A * | 11/1999 | Fisher et al. ................. | 375/258 |
| 6,600,298 B2 | 7/2003 | McDonald et al. | |
| 6,668,296 B1 * | 12/2003 | Dougherty et al. ........... | 710/303 |
| 6,724,588 B1 | 4/2004 | Cummings et al. | |
| 6,737,840 B2 | 5/2004 | McDonald et al. | |
| 6,765,365 B2 * | 7/2004 | Kim et al. ..................... | 320/112 |
| 6,831,443 B2 * | 12/2004 | Liu ................................ | 320/113 |
| 6,864,666 B2 | 3/2005 | Breen et al. | |
| 6,866,527 B2 * | 3/2005 | Potega ......................... | 439/218 |
| 6,928,568 B2 | 8/2005 | Breen et al. | |
| 6,936,936 B2 * | 8/2005 | Fischer et al. ................ | 307/151 |
| 7,039,821 B1 * | 5/2006 | Potega .......................... | 713/340 |
| 7,059,769 B1 * | 6/2006 | Potega .......................... | 374/185 |
| 7,466,042 B2 * | 12/2008 | Eldredge ....................... | 307/154 |
| 7,520,782 B1 * | 4/2009 | Huang .......................... | 439/638 |
| 7,554,828 B2 * | 6/2009 | Wilson .......................... | 363/146 |
| 7,999,412 B2 * | 8/2011 | Lanni ............................. | 307/75 |
| 2003/0060243 A1 * | 3/2003 | Burrus, IV .................... | 455/572 |
| 2003/0167345 A1 * | 9/2003 | Knight et al. ................. | 709/249 |
| 2004/0108843 A1 * | 6/2004 | Lanni ............................. | 323/271 |
| 2004/0263123 A1 | 12/2004 | Breen et al. | |
| 2005/0001589 A1 * | 1/2005 | Edington et al. ............. | 320/128 |
| 2005/0024016 A1 * | 2/2005 | Breen et al. .................. | 320/128 |
| 2005/0086545 A1 | 4/2005 | Breen et al. | |
| 2005/0162020 A1 * | 7/2005 | Lanni ............................. | 307/121 |
| 2005/0275372 A1 * | 12/2005 | Crowell ......................... | 320/112 |
| 2006/0005055 A1 * | 1/2006 | Potega .......................... | 713/300 |
| 2006/0242439 A1 * | 10/2006 | Hupman et al. .............. | 713/320 |
| 2007/0072474 A1 * | 3/2007 | Beasley et al. ............... | 439/332 |
| 2007/0073420 A1 * | 3/2007 | Lanni ............................. | 700/22 |
| 2008/0272889 A1 * | 11/2008 | Symons ........................ | 340/10.1 |
| 2008/0319732 A1 * | 12/2008 | Farnsworth ................... | 703/25 |

* cited by examiner

*Primary Examiner* — Henry Tsai
*Assistant Examiner* — Michael Sun
(74) *Attorney, Agent, or Firm* — Lando & Anastasi, LLP

(57) ABSTRACT

At least one aspect of the invention is directed to a communications adapter for coupling between a power adapter and a laptop computer. The communications adapter includes a first connector adapted to couple to the power adapter to receive DC power, and a second connector adapted to couple to a laptop computer. The communications adapter further includes a communications circuit constructed and arranged to receive signals from the laptop computer through the second connector and to provide signals to the laptop computer in response.

20 Claims, 3 Drawing Sheets

SYSTEM AND METHOD OF COMMUNICATING WITH PORTABLE DEVICES

BACKGROUND OF INVENTION

1. Field of Invention

Embodiments of the invention relate generally, but are not limited, to systems and methods for communicating with a portable device such as a laptop.

2. Discussion of Related Art

As is well known, typical laptop computers utilize an external AC to DC power adapter to charge one or more batteries of the laptop. The external adapter is connected to utility power and to a DC input on the laptop, and the adapter provides a DC voltage to the laptop to charge batteries of the laptop and/or directly power the laptop. There are several manufacturers of laptop computers, and typically, each of these manufacturers have several different models of laptop computers. Often, a different model power adapter is required for each laptop model, as each model may have different DC voltage and current requirements. Universal power adapters are available that can provide a variety of output voltages and current to match the requirements of a laptop computer. These devices typically have either multiple outputs or switched outputs that allow a user to set the output voltage and current requirements to match a laptop's requirements. One such universal power adapter is available from American Power Conversion Corporation (APC) of West Kingston, R.I. under the name TravelPower™, model number TPA90DC.

More recently, at least some laptop models and associated external power adapters include communications capabilities that allow the laptop to communicate with the external power adapter to identify the power adapter, and in at least one model, if the external power adapter is not recognized by the laptop and/or does not have communications capabilities, the laptop will either not accept power from the external power adapter or not charge the laptop batteries using power from the external power adapter. The use of these communications capabilities makes it difficult or not possible to use universal power adapters.

SUMMARY OF INVENTION

At least some embodiments of the invention are directed to systems and methods for coupling a universal power adapter to a laptop computer.

A first aspect of the invention is directed to a communications adapter for coupling between a power adapter and a laptop computer. The communications adapter includes a first connector adapted to couple to the power adapter to receive DC power, a second connector adapted to couple to a laptop computer, and a communications circuit constructed and arranged to receive signals from the laptop computer through the second connector and to provide signals to the laptop computer in response.

In the communications adapter, the first connector may have a first input to receive a DC voltage and a second input to receive a ground connection. The second connector may include a first output to provide an output DC voltage to the laptop computer, a second output to provide a ground connection to the laptop computer and a communications input/output to support communications between the laptop computer and the communications circuit. The first input of the first connector may be electrically coupled to the first output of the second connector and the second input of the first connector may be electrically coupled to the second output of the second connector. The communications adapter may further include a one-wire communications bus coupled to the second connector and the communications circuit to support communications between the communications adapter and the laptop computer. The communications circuit may be constructed and arranged to electrically couple the communications bus to a circuit node at substantially a ground potential to provide a signal to the laptop computer. The communications adapter may further include a housing containing the communications circuit and a cable coupled between the housing and the second connector.

A second aspect of the invention is directed to a method of coupling a laptop computer to a power adapter. The method includes coupling a first connector of a communications adapter to the power adapter to receive DC power from the power adapter, coupling a second connector of the communications adapter to the laptop computer to provide the DC power from the power adapter to the laptop computer, and performing a communications handshaking procedure between the communications adapter and the laptop computer.

After completing the handshaking procedure, the method may further include charging batteries of the laptop computer using the DC power from the power adapter. Performing a handshaking procedure may include communicating between the laptop computer and the communications adapter over a communications bus that extends through the second connector of the communications adapter. In the method, the communications bus may be a one-wire communications bus. The method may further include identifying a model of the laptop computer, and adjusting the communications procedure based on the identification. In the method, performing a communications handshaking procedure may include receiving signals from the laptop computer in the communications adapter, and providing a response from the communications adapter to the laptop computer.

Another aspect of the invention is directed to a communications adapter for coupling between a power adapter and a laptop computer. The communications adapter includes a first connector adapted to couple to the power adapter to receive DC power, a second connector adapted to couple to a laptop computer, and means for communicating with the laptop computer and for emulating a power adapter associated with the laptop computer.

In the communications adapter, the first connector may have a first input to receive a DC voltage and a second input to receive a ground connection. The second connector may include a first output to provide an output DC voltage to the laptop computer, a second output to provide a ground connection to the laptop computer and a communications input/output to support communications between the laptop computer and the communications adapter. The first input of the first connector may be electrically coupled to the first output of the second connector and the second input of the first connector may be electrically coupled to the second output of the second connector. The means for communicating with the laptop computer may include a one-wire communications bus implemented through the second connector.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
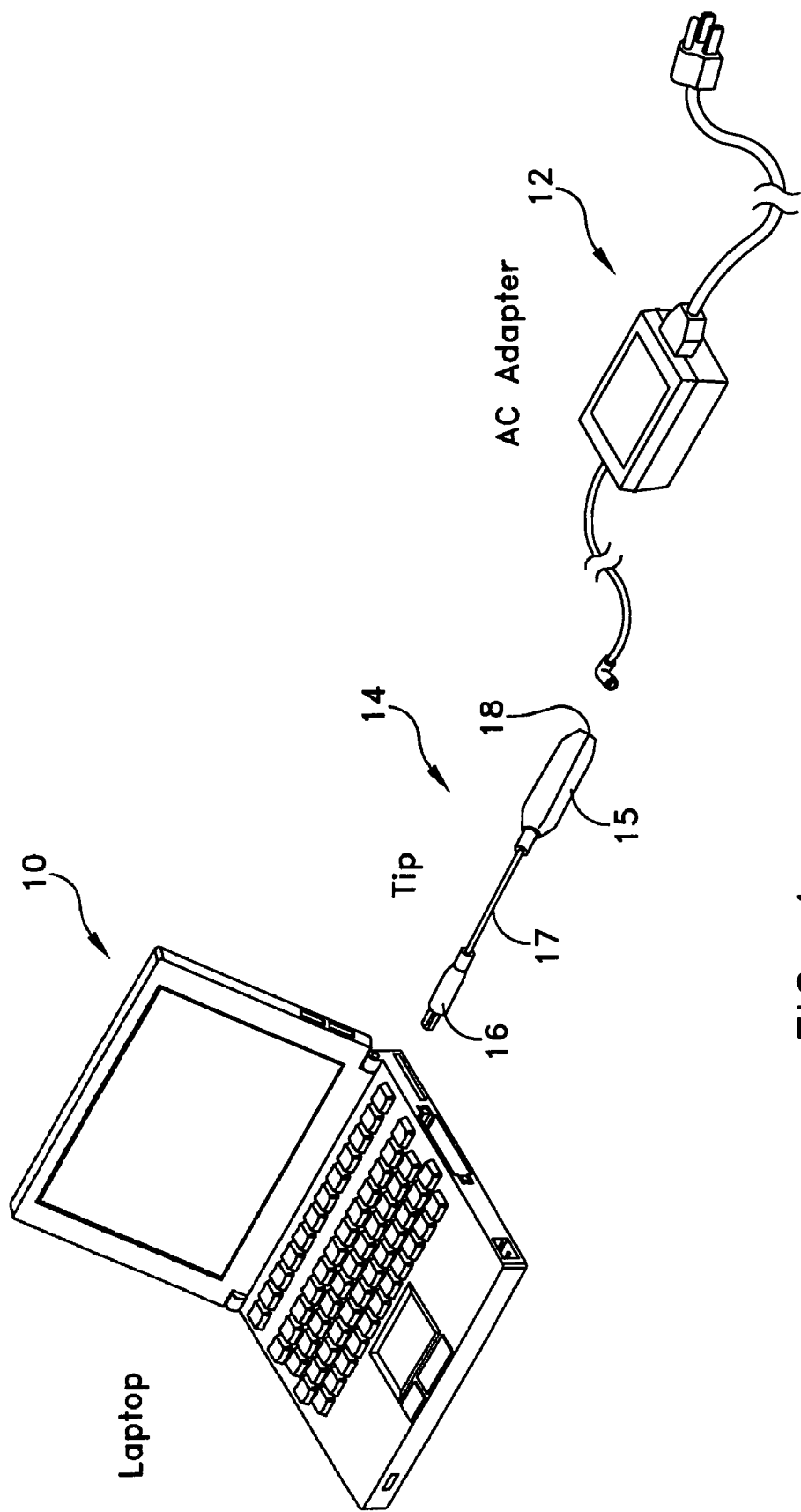
FIG. 1 is diagram showing the interconnection of a communications adapter between a laptop computer and a power adapter in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As will now be described, at least one embodiment of the invention provides a communications adapter and communications method for allowing a laptop computer having communications capabilities to operate with a universal power adapter. FIG. 1 shows a diagram of a laptop computer 10, and a universal power adapter 12 with a communications adapter 14 disposed between the power adapter and the laptop computer. The communications adapter is contained within a housing 15, has a three-wire connector 16 for coupling to the laptop computer and a two-wire connector 18 for coupling to the universal adapter. The two-wire connector 18 may either couple directly to the power adapter or couple to a connector on a cable of the power adapter. In the embodiment shown in FIG. 1, the second connector 16 is coupled to the housing 15 using a cable 17. In other embodiments, the communications adapter may have other connectors and/or cables for compatibility with other laptops and power adapters. As described below in further detail, the communications adapter is configured to be coupled between the laptop computer and the universal power adapter and operable to respond to communications from the laptop computer to enable the laptop computer to receive power and have its batteries charged from the universal power adapter through the communications adapter. In at least one embodiment, the communications adapter emulates a specific power adapter, such that the laptop computer identifies the communications adapter as the specific power adapter and allows charging of the laptop's batteries. In other embodiments, the number of wires used in connections between the devices may be greater or less than those described above.

In one illustrative embodiment that will now be described, the laptop computer is implemented using a Dell Latitude D600 laptop computer and the universal adapter is implemented using the TravelPower™ adapter discussed above, however, in other embodiments, the communications adapter 14 may be configured to operate with other laptop computers and other universal adapters.

Figure 2:
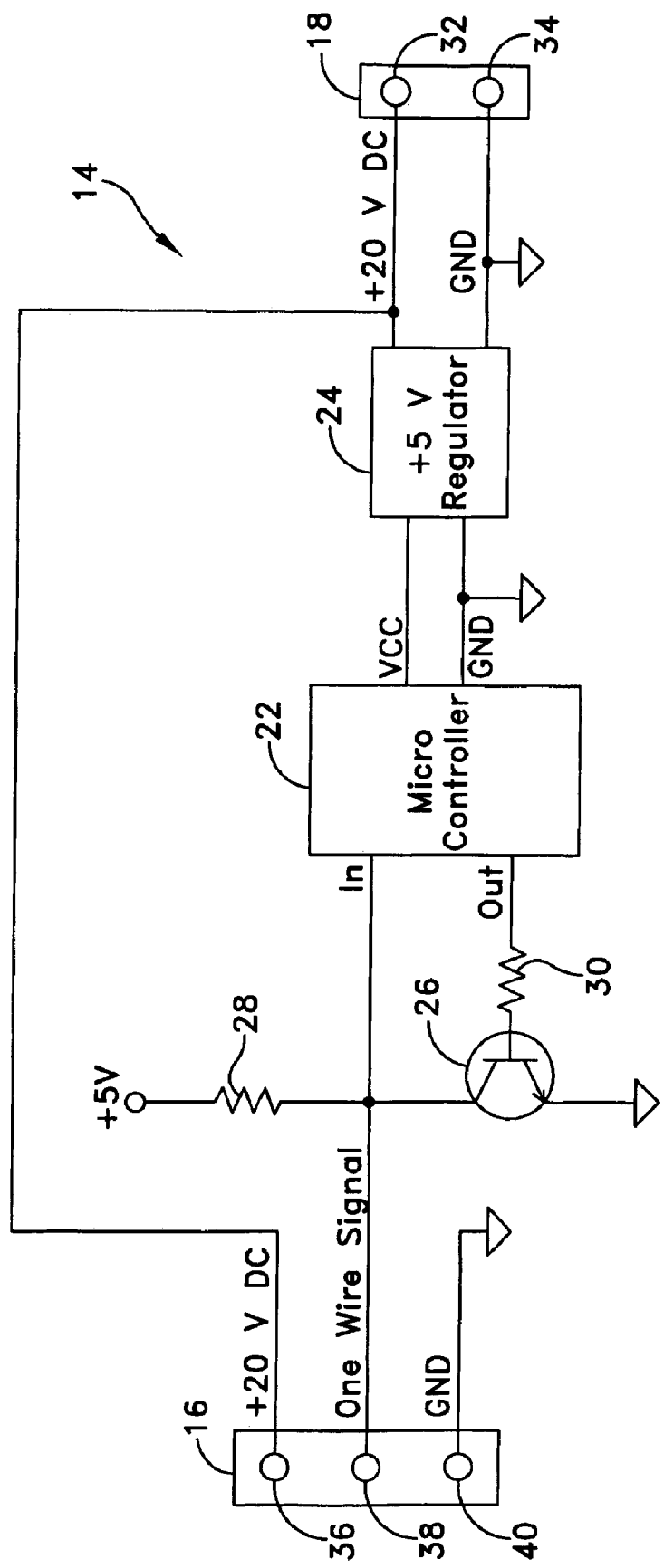
FIG. 2 is a schematic diagram of the communications adapter of FIG. 1.

The communications adapter 14 of one embodiment, will now be described further with reference to FIG. 2, which shows a schematic diagram of the communications adapter. The communications adapter includes a microcontroller 22, a regulator 24, a transistor 26 and resistors 28 and 30. The input connector 18 has two inputs 32 and 34 that respectively connect to a positive DC output and a ground output of the universal power adapter. In one embodiment, 20 VDC is provided at the positive DC output of the universal power adapter, but other voltages may be used as well. The output connector has two outputs 36 and 40, which provide the 20 volts DC and ground received at the inputs 32 and 34. The output connector also has an input/output 38 to support a one-wire communications bus for communication between the laptop computer and the communications adapter. In one embodiment, the Maxim/Dallas Semiconductor 1-wire protocol is used to implement communications over the one-wire communications bus, but other protocols and/or communications schemes may be used in other embodiments.

The regulator 24 receives the 20 volts DC from the universal adapter at an input and provides a regulated 5 VDC at an output. The 5 VDC output of the regulator is provided to the microcontroller 22 and is also provided to the resistor 28. In one embodiment, the regulator is implemented using a TL431 programmable regulator.

The microcontroller 22 is coupled to the one-wire communications bus and is also coupled to a control terminal of the transistor 26 through resistor 30. Resistor 28 is coupled between the 5 VDC output of the regulator and the one-wire communications bus. In one embodiment, the microcontroller is implemented using a microcontroller from ST Microelectronics having part no. ST72F324. Further, in one embodiment, the transistor 26 is implemented using a 2N2222 NPN transistor, resistor 28 is a 2.2 kohm resistor and resistor 30 is a 4.99 kohm resistor. In one embodiment, a 100 ohm resistor may be used between input/output 38 and the input of the microcontroller. Further, one or more overload protection devices, such as diodes, may be coupled to the input/output 38.

In operation of the communications adapter 14, the 20 VDC from the universal power adapter 12 is passed through the communications adapter to the laptop computer to provide power to the laptop computer. Further, the microcontroller in the communications adapter is programmed to detect signals from the laptop computer on the one-wire communications bus and provide responses to the laptop computer on the one-wire communications bus. Both the laptop computer and the communications adapter generate signals by pulling the communications bus low (to ground potential). In the communications adapter, the microcontroller pulls the bus low by providing a signal to transistor 26 to turn on the transistor, thereby coupling the bus to ground. Within the laptop a similar pull-down circuit, or other circuitry, may be used.

Figure 3:
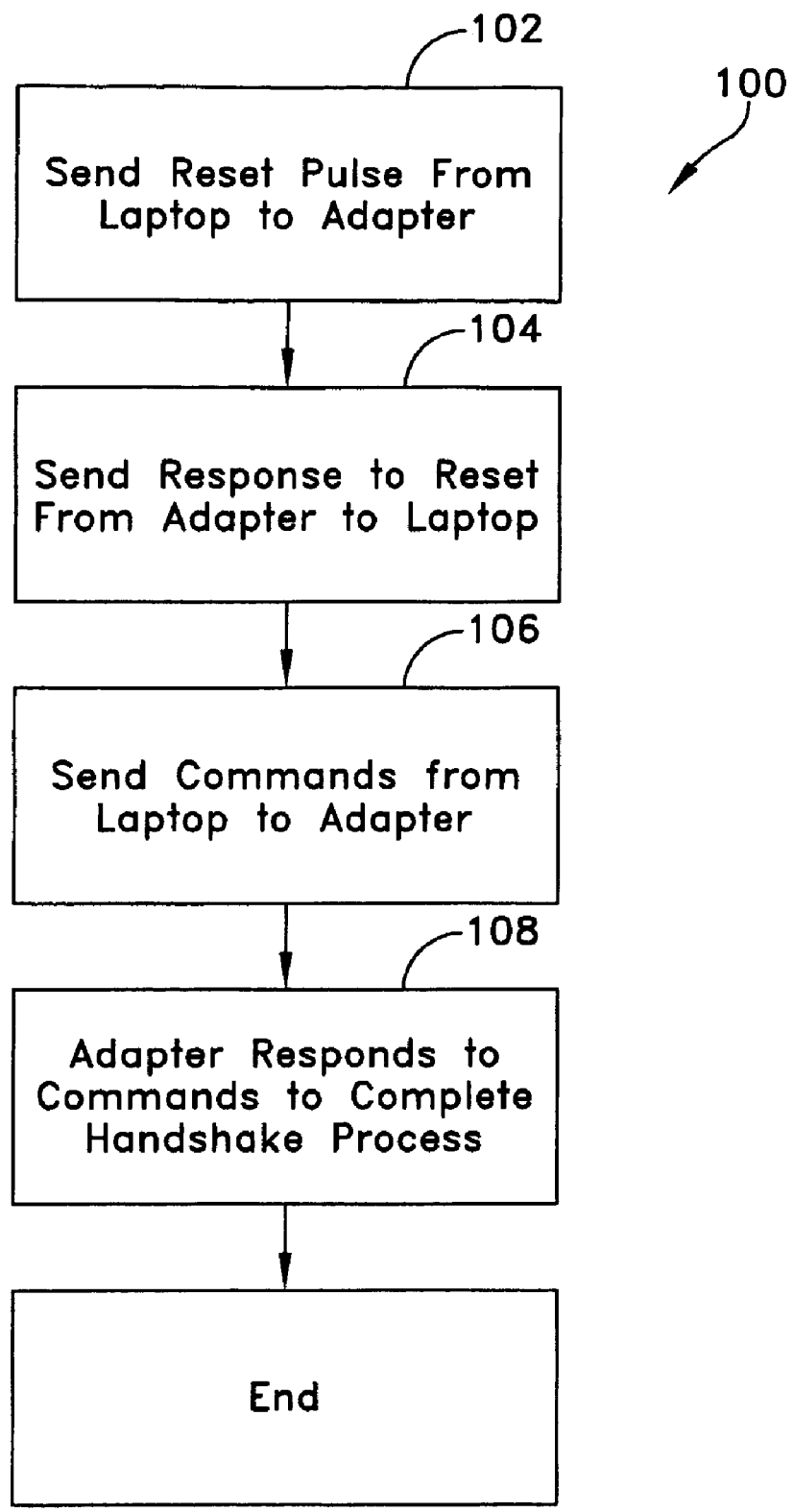
FIG. 3 is a flow chart of a communications process between a laptop computer and a communications adapter.

Different model laptop computers may use different protocols for communicating with associated power adapters, and similarly, communication adapters in embodiments of the invention may use different protocols to match the protocol used by a particular laptop computer. In one embodiment that will now be described, the communications adapter is configured to communicate with a Dell Latitude laptop computer. In this embodiment, the Dallas Semiconductor 1-wire protocol is used to complete a handshaking process 100 between the laptop computer and the communications adapter, after which the laptop computer will permit charging of its internal batteries. The process 100 will now be described with reference to FIG. 3 which provides a flow chart of the process. In a first stage 102 of the process 100, that may occur, when the laptop is first powered on or when the communications adapter 14 and AC adapter 12 are first coupled to the laptop computer, a reset pulse is sent from the laptop computer. Depending on the particular laptop being used, the reset pulse may take one of many forms, and with the Dell Latitude laptop, to indicate a reset, the laptop computer (acting as the master device) sets the communication line between the laptop computer and the communications adapter low for a preset period of time, for example, 0.5 mS. In response to the reset signal, the communications adapter at stage 104 (acting as a slave device), sets the communications line low for a period of time that is greater than, for example, 0.1 mS.

After the reset, at stage 106, the laptop computer sends a series of commands to the communications adapter. In one embodiment, the laptop, using the Maxim/Dallas protocol discussed above, sends the Read ROM command (0x33) followed by the write to EEPROM command (0x0F), and one byte of location address (0x33) and one byte of data (0x00). As readily understood by those skilled in the art, the notations in parentheses in the preceding sentence are hexadecimal notations of binary data sent between the devices. In response to the commands and data sent by the laptop computer, at stage 108, the communications adapter returns a checksum (0xDF) and data (0x0C and 0xAC). The response by the adapter completes the handshaking process, and based upon satisfactory completion of the handshaking process, the laptop computer will permit charging of its batteries from the universal adapter through the communications adapter.

In other embodiments of the invention, particularly when used with other laptop computers, other handshaking protocols may be used. Depending on the particular laptop computer being used, a different communications adapter, configured for operation with the particular laptop computer, may be used. In one embodiment, the communications adapter may include a dipswitch or other user adjustable switch or similar device to allow the communications adapter to be set for operation with different laptop computers or other electronic devices. The setting of the dipswitch may be detectable by the microcontroller in the communications adapter, and the microcontroller may determine which of a number of stored protocols and handshaking processes to use based on the dipswitch setting. In other embodiments, the microcontroller may be programmed to complete a handshaking process with a number of different laptop computers. Further, the microcontroller of the communications adapter may be programmed to identify the laptop and adjust the handshaking process based on the identity of the laptop computer.

In the embodiment discussed above, communications between the laptop computer and the communications adapter occur over a third wire (in addition to the power and ground connections) coupled between the laptop computer and the communications adapter. In other embodiments, these communications may occur on the power connection lines without the need for the additional third wire connection.

At least one embodiment described above is directed to a communications adapter for use between a universal power adapter and a laptop computer. Other embodiments may be directed to communications adapters and methods of communication with other electronic devices, such as cell phones, PDA's, portable games and portable music players.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A communications adapter for coupling between a power adapter and a laptop computer, the communications adapter comprising:
    a first connector configured to couple to the power adapter to receive DC power;
    a second connector configured to couple to a laptop computer; and
    a communications circuit constructed and arranged to receive signals from the laptop computer through the second connector and to provide signals that emulate a power adapter to the laptop computer in response;
    wherein the communications adapter is configured to directly electrically couple the first connector to the second connector and provide an output voltage at the second connector equal to an input voltage of the DC power at the first connector.

2. The communications adapter of claim 1, wherein the first connector has a first input to receive a DC voltage and a second input to receive a ground connection.

3. The communications adapter of claim 2, wherein the second connector includes a first output to provide an output DC voltage to the laptop computer, a second output to provide a ground connection to the laptop computer and a communications input/output to support communications between the laptop computer and the communications circuit.

4. The communications adapter of claim 1, further comprising a housing containing the communications circuit and a cable coupled between the housing and the second connector.

5. A communications adapter for coupling between a power adapter and a laptop computer, the communications adapter comprising:
    a first connector configured to couple to the power adapter to receive DC power;
    a second connector configured to couple to a laptop computer; and
    a communications circuit constructed and arranged to receive signals from the laptop computer through the second connector and to provide signals that emulate a power adapter to the laptop computer in response; and
    a one-wire communications bus coupled to the second connector and the communications circuit to support two-way communications between the communications adapter and the laptop computer.

6. The communications adapter of claim 5, wherein the communications circuit is constructed and arranged to electrically couple the communications bus to a circuit node at substantially a ground potential to provide a signal to the laptop computer.

7. A method of coupling a laptop computer to a power adapter, the method comprising:
    coupling a first connector of a communications adapter to the power adapter to receive DC power having a DC voltage from the power adapter;
    coupling a second connector of the communications adapter to the laptop computer to provide the DC power from the power adapter to the laptop computer;
    providing a direct electrical connection from the first connector to the second connector to provide the DC voltage at the second connector; and
    performing a communications handshaking procedure and providing signals that emulate a power adapter between the communications adapter and the laptop computer.

8. The method of claim 7, further comprising:
    after completing the handshaking procedure, charging batteries of the laptop computer using the DC power from the power adapter.

9. The method of claim 7, wherein performing a handshaking procedure includes communicating between the laptop computer and the communications adapter over a communications bus that extends through the second connector of the communications adapter.

10. The method of claim 7, further comprising identifying a model of the laptop computer, and adjusting the communications procedure based on the identification.

11. The method of claim 7, wherein performing a communications handshaking procedure includes receiving signals from the laptop computer in the communications adapter, and providing a response from the communications adapter to the laptop computer.

12. The method of claim 11, further comprising:
after completing the handshaking procedure, charging batteries of the laptop computer using the DC power from the power adapter.

13. The method of claim 12, wherein performing a handshaking procedure includes communicating between the laptop computer and the communications adapter over a communications bus that extends through the second connector of the communications adapter.

14. A method of coupling a laptop computer to a power adapter, the method comprising:
coupling a first connector of a communications adapter to the power adapter to receive DC power from the power adapter;
coupling a second connector of the communications adapter to the laptop computer to provide the DC power from the power adapter to the laptop computer; and
performing a communications handshaking procedure and providing signals that emulate a power adapter between the communications adapter and the laptop computer;
wherein performing a handshaking procedure includes communicating between the laptop computer and the communications adapter over a communications bus that extends through the second connector of the communications adapter; and
wherein the communications bus is a one-wire communications bus.

15. A communications adapter for coupling between a power adapter and a laptop computer, the communications adapter comprising:
a first connector adapted to couple to the power adapter to receive DC power;
a second connector adapted to couple to a laptop computer; and
means for communicating with the laptop computer and for emulating a power adapter associated with the laptop computer, the means for communicating including means for sending signals to and receiving signals from the laptop computer.

16. The communications adapter of claim 15, wherein the first connector has a first input to receive a DC voltage and a second input to receive a ground connection.

17. The communications adapter of claim 16, wherein the second connector includes a first output to provide an output DC voltage to the laptop computer, a second output to provide a ground connection to the laptop computer and a communications input/output to support communications between the laptop computer and the communications adapter.

18. The communications adapter of claim 17, wherein the first input of the first connector is electrically coupled to the first output of the second connector and the second input of the first connector is electrically coupled to the second output of the second connector.

19. The communications adapter of claim 15, wherein the means for communicating with the laptop computer include a one-wire communications bus implemented through the second connector.

20. The communications adapter of claim 17, wherein the first input is directly electrically coupled to the first output such that the input DC voltage is equal to the output DC voltage.

* * * * *